Patented Aug. 13, 1929.

1,724,660

UNITED STATES PATENT OFFICE.

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE.

ORANGE TO BROWN DISAZO DYES AND METHOD OF PREPARING SAME.

No Drawing. Application filed November 13, 1925. Serial No. 68,920.

This invention relates to disazo dyes for cotton and the method of preparing the same. More particularly it is concerned with orange to brown dyes with a marked affinity for cotton and their preparation by coupling diazo compounds not having a sulpho or carboxy group with an amino-benzoyl-amido-benzoyl-2-amido-5-naphthol-7-sulphonic acid, diazotizing the resulting monoazo compound and combining it with a sulpho or carboxyl-aryl-pyrazolone compound or a sulpho or carboxyl indole compound.

The Reissue No. 13,304 of U. S. P. 994,420 describes the manufacture of certain amino-benzoyl-amido-benzoyl-2-amido-5-naphthol-7-sulphonic acid compounds, which compounds have an affinity for the cotton fibre. It has now been found that valuable orange to brown disazo dyes for cotton can be made by using these intermediates as middle components. The dyes prepared in this way have the constitution: $R_1$—N=N—benzoyl-amido-benzoyl-2-amido-5-naphthol-7-sulphonic acid—N=N—$R_2$, $R_2$ being an aryl radical without a sulpho or carboxy group and $R_1$ being a grouping containing a sulpho or carboxy aryl pyrazolone radical or a sulpho or carboxy indole radical. In spite of the fact that they are comparatively soluble, these dyes show an extraordinary fastness to washing, which is nearly as good as that shown by developed dyes. They discharge to a pure white with hydrosulphite.

As first components (from which radical $R_2$ is derived) there may be used, for instance, aniline, ortho, meta or paratoluidine, xylidine, ortho or para-anisidine, chloroaniline, alpha or beta-naphthylamine, etc.

On reduction with stannous chloride these dyes will yield amino derivatives corresponding to the first components used, 2-(amino-benzoyl-amido-benzoyl-amido)-5-hydroxy-6-amino-naphthalene-7-sulphonic acid and either amino-pyrazolone or amino-indole sulpho or carboxy acids of the type:

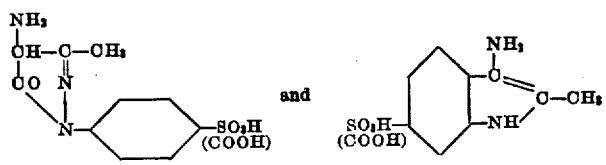

The process can best be disclosed by the presentation of a number of examples of actual embodiments thereof. It is to be understood, of course, that these examples are furnished below by way of illustration only, and that the details of procedure specified therein, as well as the particular proportions, reagents, temperatures, etc., therein disclosed are susceptible of variation and substitution.

*Example 1.*—93 parts of aniline are diazotized in the usual way, and the diazo solution is added to a solution of 477 parts of p-amino-benzoyl-p-amido-benzoyl-2-amido-5-naphthol-7-sulphonic acid in 4500 parts of water and 300 parts of sodium carbonate, keeping the coupling temperature between 5° and 10° C. The coupling, which is complete within a few minutes, is acidified with 600 parts of a 31% hydrochloric acid solution and diazotized with 69 parts of sodium nitrite. The diazotization is stirred approximately two hours at 15–20° C. or until testing for nitrite indicates completion of the reaction. The diazo compound is then added to a solution of 254 parts of p-sulpho-phenyl-methyl-pyrazolone:

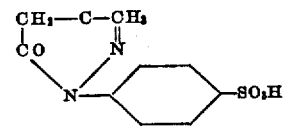

in 2000 parts of water and 400 parts of sodium carbonate, keeping the coupling temperature at 10–15° C. The dye is precipitated from the partly colloidal solution with salt. In its dry form it is a dark orange powder. It dyes cotton from an alkaline salt bath or Glauber's salt bath in bright yellowish-orange shades, which show a good fastness to light and a remarkable fastness to washing. Discharging with hydrosulphite gives a pure white. The dye has probably the formula:

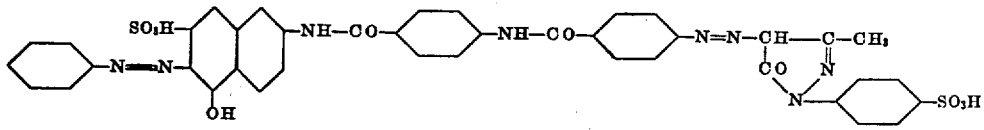

On reduction with stannous chloride this dye will yield aniline, 2-(p-amino-benzoyl-p-amido-benzoyl-amido)-5-hydroxy-6-amino-naphthalene-7-sulphonic acid, and p-sulpho-phenyl-methyl-amino-pyrazolone:

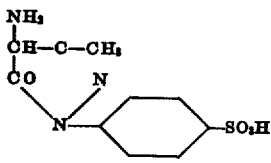

*Example 2.*—Using instead of 254 parts of p-sulpho-phenyl-methyl-pyrazolone (as in Example 1) 211 parts of methyl-ketole-sulphonic acid:

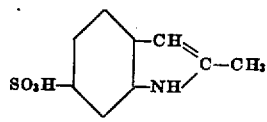

and leaving all other conditions the same as in Example 1 a somewhat redder orange is obtained, the other properties of the dye being similar to those of Example 1. The dye has probably the formula:

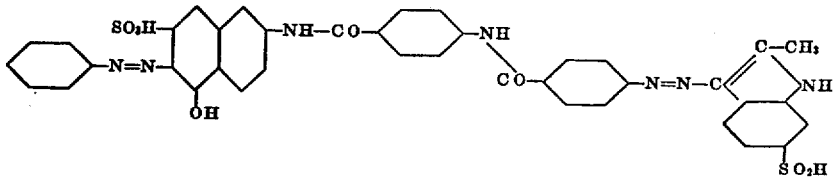

On reduction with stannous chloride this dye will yield aniline, 2-(p-amino-benzoyl-p-amido-benzoyl-amido)-5-hydroxy-6-amino-naphthalene-7-sulphonic acid and amino-methyl-ketole-sulphonic acid:

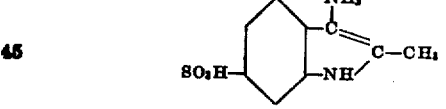

*Example 3.*—Using 121 parts of m-xylidine instead of 93 parts of aniline (as in Example 1) leaving all other conditions the same, a redder shade of orange is obtained having similar properties to those of the dye in Example 1.

On reduction with stannous chloride this dye will yield the same compounds as in Example 1, except that m-xylidine will be obtained instead of aniline.

*Example 4.*—Using instead of 93 parts of aniline as in Example 1 143 parts of alpha-naphthylamine, leaving the other conditions the same, a dye is obtained which is soluble in water with a yellowish-brown coloration, dyeing cotton in reddish-brown shades. The properties of this dye are the same as those of the dye of Example 1. The dye has probably the formula:

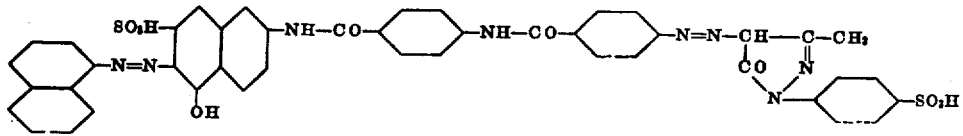

On reduction with stannous chloride this dye will yield alpha-naphthylamine, 2-(p-amino-benzoyl-p-amido-benzoyl-amido)-5-hydroxy-6-amino-naphthalene-7-sulphonic acid, and p-sulpho-phenyl-methyl-amino-pyrazolone:

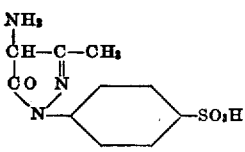

Instead of the p-amino-benzoyl-p-amido-benzoyl-2-amido-5-naphthol-7-sulphonic acid there may be used the meta-meta, para-meta, or meta-para-amino-benzoyl compound. Instead of the p-sulpho-phenyl-methyl-pyrazolone other sulpho or carboxy pyrazolones may be used, as p-carboxy-phenyl-methyl-pyrazolone, chlor-sulpho-phenyl-, sulpho-naphthyl-pyrazolones, etc. Or the carboxyl group instead of being attached directly to the phenyl radical may be attached to the pyrazolone radical as in aryl-3-carboxy-pyrazolone. Instead of the above mentioned methyl-ketole-sulphonic acid, other sulpho or carboxy indole derivatives may be used.

Dyes made according to the process described and illustrated above have an unusual affinity for cotton, and show a very good fastness to light. They are adapted for direct application by the ordinary methods.

I claim:

1. The process of producing a disazo dye which comprises coupling an amino-benzoyl-amido-benzoyl-2-amido-5-naphthol-7-sulphonic acid to an aryl diazo compound free from both sulpho and carboxyl groups, diazotizing the resulting compound and combining it with a sulpho or carboxyl aryl compound containing a pyrazolone or indole radical.

2. The process of producing a diazo dye which comprises first diazotizing an aryl-amino mono-azo compound prepared by coupling an aryl diazo compound free from both sulpho and carboxy groups with an amino-benzoyl-amido-benzoyl-2-amido-5-naphthol-7-sulphonic acid, and then coupling the resulting diazo-monoazo compound to a compound having the grouping

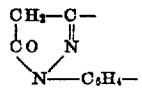

and adapted to form with the diazo-monoazo compound an orange to brown disazo dye.

3. The process of producing a disazo dye which comprises first diazotizing an aryl-amino mono-azo compound prepared by coupling an aryl diazo compound free from both sulpho and carboxy groups with an amino-benzoyl-amido-benzoyl-2-amido-5-naphthol-7-sulphonic acid and then coupling the resulting diazo-monoazo compound to an aryl-pyrazolone compound containing in the aryl nucleus an acid group adapted to form a salt.

4. The process of producing a disazo dye which comprises first diazotizing an aryl-amino monoazo compound prepared by coupling an aryl diazo compound free from both sulpho and carboxy groups with an amino-benzoyl-amido-benzoyl-2-amido-5-naphthol-7-sulphonic acid, and then coupling the resulting diazo-monoazo compound to a sulpho-aryl-pyrazolone.

5. The process of preparing a disazo dye which comprises diazotizing aniline, coupling the diazo compound with p-amino-benzoyl-p-amido-benzoyl-2-amido-5-naphthol-7-sulphonic acid to obtain a monoazo compound, diazotizing said compound and coupling the resulting diazo-monoazo compound to p-sulpho-phenyl-methyl-pyrazolone.

6. A disazo dye characterized by yielding on reduction with stannous chloride 2-(amino-benzoyl-amido-benzoyl-amido)-5-hydroxy-6-amino-naphthalene-7-sulphonic acid and p-sulpho-phenyl-methyl-amino-pyrazolone.

7. A disazo dye comprising the grouping benzoyl-amido-benzoyl-2-amido-5-naphthol-7-sulphonic acid coupled with an aryl diazo radical free from both sulpho and carboxyl groups, said grouping being also coupled with an aryl pyrazolone or indole radical containing an acid group adapted to form a salt.

8. A disazo dye comprising the grouping benzoyl-amido-benzoyl-2-amido-5-naphthol-7-sulphonic acid coupled with an aryl diazo compound free from both sulpho and carboxy groups, said grouping being also coupled with an aryl pyrazolone containing an acid group and adapted to form therewith an orange to brown disazo dye.

9. A disazo dye comprising the grouping benzoyl-amido-benzoyl-2-amido-5-naphthol-7-sulphonic acid coupled with an aryl diazo compound free from both sulpho and carboxy groups, said grouping being also coupled with a sulpho-aryl-pyrazolone.

10. A disazo dye comprising the grouping benzoyl-amido-benzoyl-2-amido-5-naphthol-7-sulphonic acid coupled with an aryl diazo compound free from both sulpho and carboxy groups, said grouping being also coupled with an aryl-pyrazolone compound containing in the aryl nucleus an acid group adapted to form a salt.

11. A disazo dye comprising the grouping benzoyl-amido-benzoyl-2-amido-5-naphthol-7-sulphonic acid coupled with an aryl diazo radical free from both sulpho and carboxyl groups, said grouping being also coupled with a phenyl pyrazolone containing a sulpho or carboxyl group.

12. A disazo dye comprising the grouping benzoyl-amido-benzoyl-2-amido-5-naphthol-7-sulphonic acid coupled with an aryl diazo radical free from both sulpho and carboxyl groups, said grouping being also coupled with a p-sulpho-phenyl-methyl-pyrazolone.

13. A textile material colored with the dyestuff set forth in claim 7.

In testimony whereof I affix my signature.

HENRY JORDAN.

Certificate of Correction.

Patent No. 1,724,660. Granted August 13, 1929, to

HENRY JORDAN

It is hereby certified that error appears in the printed specification of the above numbered patent requiring correction as follows: Page 2, after line 15, strike out the formula and insert instead

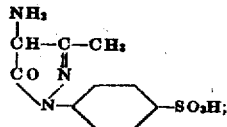

page 3, line 41, claim 2, for the word "diazo" read *disazo*; and that the said Letters Patent should be read with these corrections therein that the same may conform to the record of the case in the Patent Office.

Signed and sealed this 17th day of September, A. D. 1929.

[SEAL.]

M. J. MOORE,
*Acting Commissioner of Patents.* radical free from both sulpho and carboxyl groups, said grouping being also coupled with a phenyl pyrazolone containing a sulpho or carboxyl group.

12. A disazo dye comprising the grouping benzoyl-amido-benzoyl-2-amido-5-naphthol-7-sulphonic acid coupled with an aryl diazo radical free from both sulpho and carboxyl groups, said grouping being also coupled with a p-sulpho-phenyl-methyl-pyrazolone.

13. A textile material colored with the dyestuff set forth in claim 7.

In testimony whereof I affix my signature.

HENRY JORDAN.

Certificate of Correction.

Patent No. 1,724,660. Granted August 13, 1929, to

HENRY JORDAN

It is hereby certified that error appears in the printed specification of the above numbered patent requiring correction as follows: Page 2, after line 15, strike out the formula and insert instead

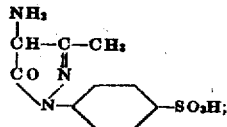

page 3, line 41, claim 2, for the word "diazo" read *disazo*; and that the said Letters Patent should be read with these corrections therein that the same may conform to the record of the case in the Patent Office.

Signed and sealed this 17th day of September, A. D. 1929.

[SEAL.]

M. J. MOORE,
*Acting Commissioner of Patents.*